United States Patent
Ericson et al.

(10) Patent No.: US 10,924,957 B2
(45) Date of Patent: Feb. 16, 2021

(54) MEASUREMENTS AND SIGNALLING FOR FAST SETUP

(71) Applicant: Telefonaktiebolaget LM Ericsson (publ), Stockholm (SE)

(72) Inventors: Mårten Ericson, Luleå (SE); Rui Fan, Beijing (CN); Gunnar Mildh, Sollentuna (SE); Osman Nuri Can Yilmaz, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/494,616

(22) PCT Filed: Mar. 22, 2018

(86) PCT No.: PCT/SE2018/050296
§ 371 (c)(1),
(2) Date: Sep. 16, 2019

(87) PCT Pub. No.: WO2018/203787
PCT Pub. Date: Nov. 8, 2018

(65) Prior Publication Data
US 2020/0137600 A1   Apr. 30, 2020

Related U.S. Application Data

(60) Provisional application No. 62/501,830, filed on May 5, 2017.

(51) Int. Cl.
*H04W 24/10* (2009.01)
*H04W 74/08* (2009.01)
*H04W 36/00* (2009.01)

(52) U.S. Cl.
CPC ....... *H04W 24/10* (2013.01); *H04W 74/0833* (2013.01); *H04W 36/0058* (2018.08); *H04W 36/0088* (2013.01)

(58) Field of Classification Search
None
See application file for complete search history.

(56) References Cited

U.S. PATENT DOCUMENTS

| 2012/0231782 | A1  | 9/2012  | Hellander et al. |
| 2017/0367120 | A1* | 12/2017 | Murray ............... H04W 72/046 |
| 2018/0007574 | A1* | 1/2018  | Park .................... H04W 72/042 |

FOREIGN PATENT DOCUMENTS

WO   2018063073 A1   4/2018

OTHER PUBLICATIONS

International Search Report and Written Opinion for PCT International Application No. PCT/SE201/050296 dated Jul. 9, 2018.

(Continued)

*Primary Examiner* — Jutai Kao
(74) *Attorney, Agent, or Firm* — Sage Patent Group

(57) ABSTRACT

A wireless device, a network node and a respective method performed thereby for performing measurements for fast setup are provided. The method performed by the wireless device comprises receiving, during a RACH procedure, a "message 4" (Msg 4), which Msg 4 may be a contention resolution, the Msg 4 comprising a trigger for performing a fast measurement. The method also comprises performing a fast measurement on one or more carrier(s) that the wireless device receives. The method may further comprise sending a measurement report to the network node which sent the Msg 4 to the wireless device.

20 Claims, 7 Drawing Sheets

(56) References Cited

OTHER PUBLICATIONS

Ericsson, "Faster measurements and signaling for Ultra reliable mobility," 3GPP TSG-RAN WG2 #97bis, Tdoc R2-1702713, Spokane, USA, Apr. 3-7, 2017, 5 pages.
Ericsson, "Faster measurements and signaling for mobility," 3GPP TSG-RAN WG2 #97bis; Tdoc R2-1702713; Spokane, USA, Apr. 3-7, 2017, 5 pages.
Samsung, "Overview on beam management," 3GPP TSG RAN WG1 #86-bis; R1-1609080, Lisbon, Portugal, Oct. 10-14, 2016, 5 pages.
NEC, "RACH Resource Control," 3GPP TSG-RAN WG2#58; R2-071626, Kobe, Japan, May 7-11, 2007, 3 pages.

* cited by examiner

MEASUREMENTS AND SIGNALLING FOR FAST SETUP

CROSS REFERENCE TO RELATED APPLICATIONS

This application is a 35 U.S.C. § 371 national stage application of PCT International Application No. PCT/SE2018/050296, filed on Mar. 22, 2018, which itself claims priority to U.S. Provisional Application No. 62/501,830 filed May 5, 2017, the disclosure and content of both of which are incorporated herein by reference in their entireties.

TECHNICAL FIELD

The present disclosure relates to wireless or radio communication and in particular to measurements and signalling for fast setup. The present disclosure relates generally to a wireless device and methods performed thereby for performing measurements for fast setup. The present disclosure also relates generally to a network node and methods performed thereby for requesting measurements for fast setup.

BACKGROUND

The channel variations in New Radio (NR), e.g., 5G which is short for $5^{th}$ Generation, may be both faster and more severe than in previous communication systems such as e.g., 4G, or 3G, due to the lower dispersion at high frequencies. Typically, handover (HO) measurements are averaged in time and relatively slow in order to avoid ping-pong effects. Performing frequent HO to and from the same cells in normal scenarios should be avoided since it will increase overhead, both in terms of random access resources and Radio Resource Control (RRC) signalling, and also increase the risk of HO failures. The measurements of the channels from different cells may be subjected to, so called, fading, both slow, and fast fading. Without averaging, a UE may perform HO based on a temporary fading top, but after a short time, the new channel may be worse than the old one, and the UE may perform a new HO, and repeat this several times. Typically, it may be advisable to average out the fast fading, but not the slow fading, e.g., it may be enough to average 0.5s approximately. Hence, there are good reasons why the ordinary HO measurements are configured as they are, i.e., relatively slow. In LTE, also known as 4G, User Equipments (UEs) may be required to perform the intra frequency handover measurements within 200 ms and inter frequency measurements within 480 ms, when there is no Discontinuous Reception (DRX) applied. It may require even longer time to perform measurements in case that DRX is applied. These handover measurements, e.g., Reference Signal Received Power (RSRP), Reference Signal Received Quality (RSRQ), are too slow to be able to react to the sudden channel changes in NR.

Further on, much of the traffic in LTE may consist of very small data transmissions, e.g., in the order of ~100 Kbits, with rather large intervals. This means the UE may quite often enter the IDLE/INACTIVE state in between the data transmissions. Furthermore, the NR frequency bands may include both low and high mmW frequency bands, where the mmW bands will have a large amount of chunks of bandwidths. It may be understood that the bandwidth scales linearly with the possible throughput, that is, the bitrate, that may be achieved. Therefore, these higher frequency bands may be considered to provide both advantages and disadvantages. On the one hand, the pathgain may be worse, but the possible throughput that may be achieved may be very high, due to the high bandwidth. This may be understood to mean that the coverage of the cell using high frequencies may become smaller, which may be understood to mean that a UE may need to be closer to the network node in order to send and receive data. At the same time, this may be understood to mean that if the UE is in coverage of these high frequency cells, the bit rate the UE may achieve may be very high. When the UE enters IDLE/INACTIVE state it will most often camp on the cells with lower frequencies due to better pathgain. That is, the UE may receive the signal from a cell with lower frequency with higher signal strength than from a cell with high frequency.

The fact that, with existing methods, a UE may quite often enter the IDLE/INACTIVE state in between the data transmissions may result in an inefficient use of available radio resources, leading to low suboptimal throughput and poor load balancing. This in turn results in a poor performance of a radio communications network, with reduced capacity, higher latency, and waste of processing and energy resources.

SUMMARY

The object of embodiments herein is to obviate at least some of the problems outlined above. In particular, it is an object of embodiments herein to provide a wireless device and a method performed thereby for performing measurements for fast setup. Another object is to provide a network node and a method performed thereby for requesting measurements for fast setup. These objects and others may be obtained by providing a wireless device, a network node and a method performed by a wireless device and a network node according to the embodiments and examples described herein.

According to a first aspect of embodiments herein, the object is achieved by a method performed by a wireless device. The method is for performing measurements for fast setup. The wireless device receives, from a network node, during a Random Access Channel (RACH) procedure, a message 4 (Msg 4). The Msg 4 comprises a trigger for performing a fast measurement. The wireless device performs the fast measurement on one or more carriers that the wireless device receives. The fast measurement is performed within at least one of: i) less than 200 milliseconds in an intra-frequency carrier, and ii) less than 480 milliseconds in an inter-frequency carrier. The wireless device then sends a measurement report, based on the fast measurement, to the network node.

According to a first aspect of embodiments herein, the object is achieved by a method performed by a network node. The method is for requesting measurements for fast setup. The network node transmits, to the wireless device, during the RACH procedure, the Msg 4 to the wireless device. The Msg 4 comprises the trigger for performing the fast measurement. The fast measurement is to be performed within at least one of: i) less than 200 milliseconds in an intra-frequency carrier, and ii) less than 480 milliseconds in an inter-frequency carrier. The network node then receives a measurement report, based on the fast measurement, from the wireless device.

According to a first aspect of embodiments herein, the object is achieved by the wireless device, configured to perform the measurements for fast setup. The wireless device is further configured to receive, from the network node, during the RACH, procedure, the Msg 4. The Msg 4 is configured to comprise the trigger for performing the fast measurement. The wireless device performs the fast measurement on the one or more carriers that the wireless device is configured to receive. The fast measurement is configured to be performed within at least one of: i) less than 200 milliseconds in an intra-frequency carrier, and ii) less than 480 milliseconds in an inter-frequency carrier. The wireless device then sends a measurement report, based on the fast measurement, to the network node.

According to a first aspect of embodiments herein, the object is achieved by the network node, configured to request the measurements for fast setup. The network node is further configured to transmit, during the RACH procedure the Msg 4, to the wireless device. The Msg 4 is configured to comprise the trigger for performing the fast measurement. The fast measurement is configured to be performed within at least one of: i) less than 200 milliseconds in an intra-frequency carrier, and ii) less than 480 milliseconds in an inter-frequency carrier. The network node receives the measurement report, based on the fast measurement, from the wireless device.

The wireless device, the network node and the method performed by the wireless device and the network node respectively have several advantages. By the network node sending and the wireless device receiving the Msg 4 comprising the trigger for performing the fast measurement during the RACH procedure, the wireless device is enabled to perform the fast measurement on the one or more carriers that the wireless device receives. The wireless device is further enabled to send the measurement report to the network node. The wireless device is therefore enabled to take advantage any possible Multi connectivity (MC)/Dual connectivity (DC)/Carrier aggregation (CA) options before it may begin to transmit data, and thus enabled to obtain higher user throughput. Furthermore, also enabled is achieving better load balancing, e.g., between macro cells using low frequency, and small cells using high frequency. Moreover, by the wireless device receiving the trigger for performing the fast measurement in the Msg 4, when the wireless device may have already been identified by the network node, the network node may be able to address the wireless device and know a capability or capabilities of the wireless device, e.g., which frequency bands the wireless device may support, which CC combination, etc. Additionally, the Msg 4 may provide additional benefits, such as having higher priority, and being more robust. Moreover, by the time the wireless device receives the Msg 4, the network node may have a better knowledge of a radio link condition of the wireless device.

BRIEF DESCRIPTION OF THE DRAWINGS

Embodiments will now be described in more detail in relation to the accompanying drawings, and according to the following description.

DETAILED DESCRIPTION

As part of the development of embodiments herein, a problem in existing methods will first be identified and discussed.

In existing methods, a UE may have the possibility of increasing the throughput by using more than one available carrier for transmission by taking advantage of any of Carrier aggregation (CA), Dual connectivity (DC), and Multi connectivity (MC) opportunities.

All of CA/DC/MC may be understood to be about adding 2 or more carriers, that is, frequency bands, to one UE, in Downlink (DL) and Uplink (UL), and thereby be able to transmit more data to and from the UE.

In CA, the carriers may be understood to be from same radio system, e.g., LTE, and may be closely coupled, that is, synchronised.

DC may be understood to mean that two cells are used for transmitting, and receiving, from one UE. When using DC, the cells may be more loosely coupled than in CA. DC may also be between LTE and 5G.

MC is a term that more specifically refers to 5G and it may be understood to mean that more than two 5G cells may be used to transmit data, e.g., different data, to the UE, and the UE may also transmit data to more than two 5G cells.

Figure 1:
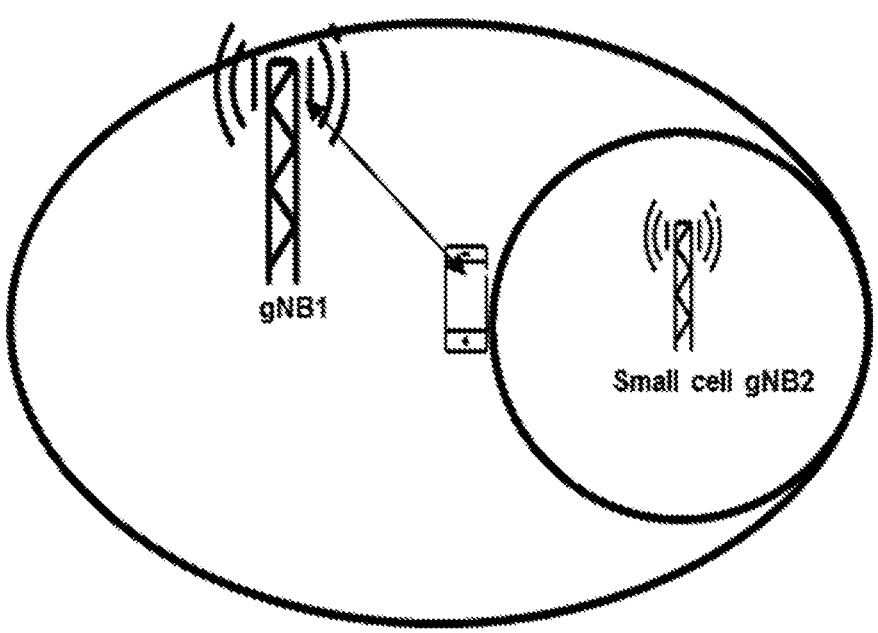
FIG. 1 is an illustration of a UE camping on a gNB, which is the stronger gNB of two gNBs in the surroundings of the UE.

Given these options, a problem with existing mobility methods is that a UE entering CONNECTED mode, also called CONNECTED state, may not take advantage of the possible CA/DC/MC opportunities. A connected state may be understood herein as the state where the UE may transmit and receive data from one or more network nodes or cells. An IDLE or INACTIVE state may be understood herein as a battery saving state where the UE is "loosely" connected to only one network node or cell, it is e.g., not fully synchronized, typically the cell with the highest pathgain. This may be often referred to as that the UE camps on a cell. In the IDLE or INACTIVE states, the UE may only listen to acell in certain short time periods, and between these short periods the UE may enter battery saving modes. If there is a message for the UE, the UE may also need to perform a new establishment to the network node in order to enter the CONNECTED state and receive and/or transmit data. Assume for example the scenario in FIG. 1. FIG. 1 is a schematic illustration of a UE camping on a network node, gNB1, which is the stronger gNB of two gNBs within its radio coverage. The reason that gNB1 is stronger—gNB1 has higher pathgain—than gNB2 may be, for example, that gNB1 utilizes lower frequency than gNB2. When entering the CONNECTED mode for data transmission, the UE will only utilise the gNB1, providing the stronger coverage, that is, providing the higher pathgain than gNB2, even though the small cell gNB2 is good enough for DC/MC. This is because the UE camps on the first base station, gNB1, when it enters the IDLE/INACTIVE state, due the higher pathgain. When the UE has data to transmit, it enters the ACTIVE state, and starts transmitting to gNB1. At the same time, the UE starts measuring on inter-frequency carriers according to the network configurations. Due to the delay incurred to measure the relative good high mmW frequency cell, gNB2, the UE will be finished transmitting the small packets before it has time to enter DC/CA/MC with gNB2. The delay may be due to, on the one hand, the long averaging of measurement, e.g., 480 ms, and, on the other hand, it may be due to the fact that the UE may need to wait to start measuring after it has entered connected state. This may be considered to occur according to existing methods, e.g., a standard, whereby when a UE goes into IDLE or INACTIVE mode, it may camp, see above, to the cell or network node with the strongest pathgain, typically an LTE base station, which is a master station using low frequency, even if at the same time, a secondary carrier on e.g., a 5G base station with relatively good pathgain may be available.

A UE is also referred to as a wireless device and a wireless device may be a mobile telephone, a smartphone, a Personal Digital Assistant (PDA), a laptop, a computer, a vehicle having means for wireless or radio communication etc.

One solution for this may be to reuse the information obtained from the measurement performed during the IDLE/INACTIVE state when the UE enters the ACTIVE state, and thereby connect to the gNB2 too before the data transmission is done. However, the measurements performed during the IDLE state may not always be valid when the UE, which may also be referred to as wireless device, enters the ACTIVE state. The reason for this is that the measurements are performed with rather large intervals and the UE movement may make them invalid.

A new LTE Work Item Description (WID) also has the purpose to enable more efficient and faster DC, as well as CA setup times which may be equally beneficial for NR deployments.

Figure 2:
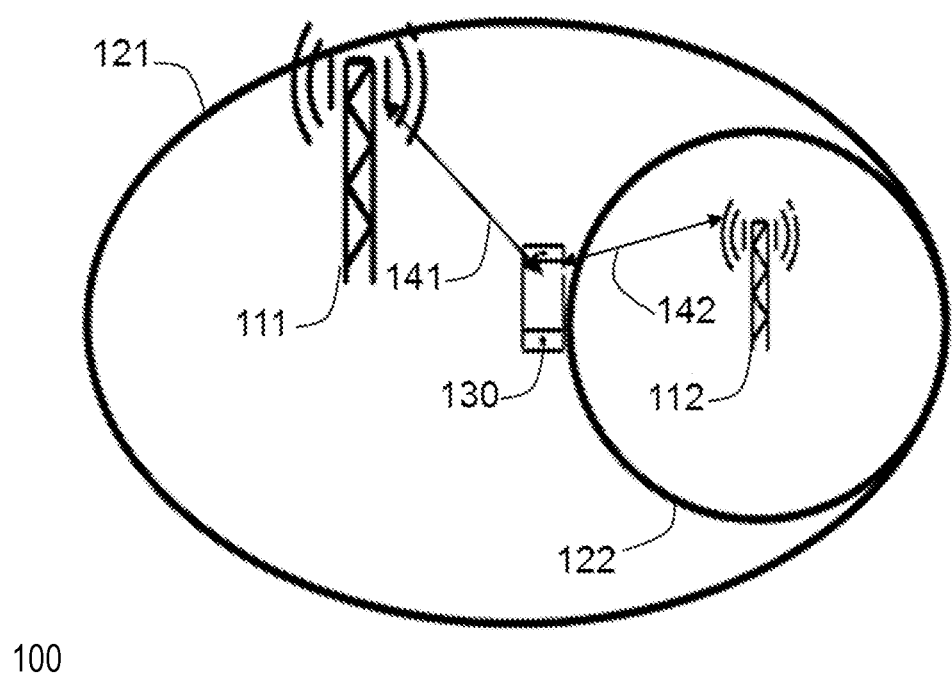
FIG. 2 is a schematic diagram illustrating a radio communication network, according to embodiments herein.

Addressing the problems of existing methods described above, embodiments herein are based on the recognition that it may be beneficial to perform a fast measurement directly during the transition to the CONNECTED state in order to have a measurement of the current situation for the UE. As a brief overview, it may be considered that embodiments herein describe methods whereby, during the Random Access CHannel (RACH) procedure, the network may send an indication, e.g., to a wireless device, to do a fast measurement, e.g., achieved by short L3 filtering, on neighbouring cells. This may be done using the Msg 4 contention resolution message, which may include: a) one or more frequencies to do a fast measure on, e.g., frequency f2 and f3, b) a L3 filter length, that is, an indication of a measurement period, c) a bandwidth to perform fast measure on, and d) a new measurement reporting criteria. According to particular embodiments herein, a gNB1 may include a fast measurement indication to a UE using the RACH Msg 4 content resolution message, as schematically depicted in FIG. 2.

Note that in a previous proposal, in 3GPP, R2 1702713, "Faster measurements and signaling for mobility", an approach was suggested to address this problem, which was based on using Msg 2, but this is deemed to not work since the network has no possibility to identify the UE.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from 5G and 3GPP LTE has been used in this disclosure to exemplify the embodiments herein, this should not be seen as limiting the scope of the embodiments herein to only the aforementioned system. Other wireless systems with similar characteristics, may also benefit from exploiting the ideas covered within this disclosure.

FIG. 2 depicts a non-limiting example of a radio communication network 100, sometimes also referred to as a wireless communications system, cellular radio system, or cellular network, in which embodiments herein may be implemented. The radio communication network 100 may typically be a 5G system, 5G network, or Next Gen System or network. The radio communication network 100 may support other technologies such as, for example, Long-Term Evolution (LTE), e.g., LTE Frequency Division Duplex (FDD), LTE Time Division Duplex (TDD), LTE Half-Duplex Frequency Division Duplex (HD-FDD), LTE operating in an unlicensed band, Wideband Code Division Multiplexing Access (WCDMA), Universal Terrestrial Radio Access (UTRA) TDD, Global System for Mobile communications (GSM) network, Enhanced Data for GSM Evolution (EDGE) network, GSM/EDGE Radio Access Network (GERAN) network, Ultra-Mobile Broadband (UMB), network comprising any combination of Radio Access Technologies (RATs) such as e.g., Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR and LTE may be used in this disclosure to exemplify embodiments herein, this should not be seen as limiting the scope of the embodiments herein to only the aforementioned system.

The radio communication network 100 comprises a plurality of network nodes, whereof a first network node 111, which may also be referred to herein simply as network node 111, and a second network node 112 are depicted in the non-limiting example of FIG. 2. Each of the network node 111 and the second network node 112 may be radio network nodes. In other examples, which are not depicted in FIG. 2, any of the network node 111 and the second network node 112 may be a distributed node, such as a virtual node in the cloud, and may perform its functions entirely on the cloud, or partially, in collaboration with a radio network node.

Each of the network node 111 and the second network node 112 may be gNB. That is, a transmission point such as a radio base station, for example an eNB, an eNodeB, or a Home Node B, an Home eNode B or any other network node capable of serving a wireless device, such as a user equipment or a machine type communication device, in the radio communication network 100. In some examples, at least one of the network node 111 and the second network node 112 may be a gNB, and the other may be an LTE eNB. The embodiments described herein may be applicable to any multicarrier system wherein at least two radio network nodes may configure radio measurements for a same wireless device. One scenario may comprise, for example, a dual connectivity deployment with LTE PCell and NR PSCell. Another example scenario may comprise, for example, a dual connectivity deployment with NR PCell and NR PSCell.

The radio communication network 100 covers a geographical area which may be divided into cell areas, wherein each cell area may be served by a network node, although, one radio network node may serve one or several cells. The radio communication network 100 may comprise at least a first cell 121 and a second cell 122. In the non-limiting example depicted in FIG. 2, the network node 111 serves the first cell 121, and the second network node 112 serves the second cell 122. Each of the network node 111, and the second network node 112 may be of different classes, such as, e.g., macro eNodeB, home eNodeB or pico base station, based on transmission power and thereby also cell size. Each of the network node 111 and the second network node 112 may support one or several communication technologies, and its name may depend on the technology and terminology used. In 5G/NR, each of the second network node 112 and the second network node 112, which may be referred to as gNBs, may be directly connected to one or more core networks, which are not depicted in FIG. 2.

A plurality of wireless devices is located in the radio communication network 100, whereof a wireless device 130, is depicted in the non-limiting examples of FIG. 2. A wireless device in this disclosure, such as the wireless device 130 comprised in the radio communication network 100, may be any device capable of wireless or radio communication with another device, such as a 5G UE, or a UE. Merely as some non-limiting examples, the wireless device 130 may be a mobile terminal, a mobile station, a mobile phone, wireless terminal and/or mobile station, a mobile telephone, cellular telephone, or laptop with wireless capability, a smartphone, a Personal Digital Assistant (PDA), a laptop, a vehicle comprising wireless communication means, etc. Any of the wireless devices comprised in the radio communication network 100 may be, for example, portable, pocket-storable, hand-held, computer-comprised, or a vehicle-mounted mobile device, enabled to communicate voice and/or data, via the RAN, with another entity, such as a server, or a tablet computer, Machine-to-Machine (M2M) device, device equipped with a wireless interface, such as a printer or a file storage device, modem, or any other radio network unit capable of communicating over a radio link in a communications system. The wireless device 130 comprised in the radio communication network 100 is enabled to communicate wirelessly in the radio communication network 100. The communication may be performed e.g., via a RAN, and possibly the one or more core networks, which may comprised within the radio communication network 100.

The wireless device 130 may be configured to communicate within the radio communication network 100 with the network node 111 over a first link 141, e.g., a radio link. The wireless device 130 may be configured to communicate within the radio communication network 100 with the second network node 112 over a second link 142, e.g., a radio link.

In general, the usage of "first", "second", and/or "third", and "fourth" herein may be understood to be an arbitrary way to denote different elements or entities, and may be understood to not confer a cumulative or chronological character to the nouns they modify.

Embodiments of a method 300 performed by a wireless device 130, e.g., a UE, will now be described with reference to the flowchart depicted in FIG. 3. The method is for performing measurements for fast setup. That is, the method may be understood to be for performing a fast measurement for a fast setup to the second link 142. A fast setup may be understood as a procedure to find the second link 142 at an early stage, and connect to the second link 142 as fast as possible. The wireless device 130 may be understood to operate in the radio communication network 100.

The method comprises the actions described below. Several embodiments are comprised herein. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

Action 310

In order to enable the wireless device 130 to take advantage of the MC/DC/CA options it may have, before the wireless device 130 is done transmitting the data it may have to transmit, and thus in order to enable the measurement on neighboring cells to be performed with at least a shorter delay than in existing methods, in this Action 310, the wireless device 130 receives, from the network node 111, during a RACH procedure, a "message 4" (Msg 4). The Msg 4 comprises a trigger for performing a fast measurement.

The measurement may be understood as any measurement performed on radio signals. The term "measurement", as used herein, may be also understood to equally refer to a radio measurement. The measurements may be absolute or relative. A radio measurement may also be referred to as a signal level, which may be a signal quality and/or a signal strength. The measurements may be e.g., intra-frequency, inter-frequency, inter-RAT measurements, CA measurements, etc. Radio measurements may be unidirectional, e.g., DL or UL, or bidirectional, e.g., Round-Trip Time (RTT), Reception-Transmission (Rx-Tx), etc. Some examples of measurements may be timing measurements, e.g., Time of Arrival (TOA), timing advance, RTT, Reference Signal Time Difference (RSTD), Rx-Tx, propagation delay, etc., angle measurements, e.g., angle of arrival, power-based measurements, e.g., Received Signal Power (RSRP), Received Signal Quality (RSRQ), Signal to Interference plus Noise Ratio (SINR), Signal to Noise Ratio (SNR), interference power, total interference plus noise, Received Signal Strength Indicator (RSSI), noise power, etc. . . . , cell detection or cell identification, Radio Link Monitoring (RLM), System Information (SI) reading, etc.

Performing a measurement on a carrier may imply performing measurements on signals of one or more cells operating on that carrier or performing measurements on signals of the carrier, a.k.a. carrier specific measurement e.g., Received Signal Strength Indicator (RSSI). Examples of cell specific measurements may be signal strength, signal quality, etc.

The fast measurement may be understood as a measurement that may be performed faster than existing handover measurements. That is, a measurement that is performed within at least one of: i) less than 200 milliseconds in an intra-frequency carrier, and ii) less than 480 milliseconds in an inter-frequency carrier. The measurement may be faster by involving a shorter filtering period, for example using a shorter Layer 3 (L3) length in LTE/NR.

The Msg 4 may be a contention resolution message, e.g., in LTE. That is, the Msg 4 may be a message in response to a connection request message, e.g., Msg 3 in LTE, received from the wireless device 130. The Msg 4 may be understood as a confirmation that the network node 111 received the Msg 3 and identified the wireless device 130 correctly. In addition, the Msg 4 may typically comprise a new, unique, identifier for the wireless device 130, e.g., a UE identifier.

In order to enable the wireless device 130 to perform a fast measurement, the Msg 4 may comprise at least one of: i) a frequency, that is a radio frequency, to perform the fast measurement on, ii) information relating to which carriers to perform the fast measurement on, iii) which inter-frequency carrier or inter-frequency carriers to perform the fast measurement on, iv) a measurement period to perform the fast measurement, v) a bandwidth to perform the fast measurement on, and vi) a measurement reporting criteria on surrounding cells. That is, the Msg 4 may instruct the wireless device 130 on how to perform the measurement, so the measurement may be performed in a shorter amount of time, with respect to existing methods.

The information relating to which carriers to perform the fast measurement on may comprise for example the last second link 142 the wireless device 130 was connected to.

With regards to the fact that the Msg 4 may also contain which inter-frequency carrier(s) the wireless device 130 may need to perform a fast measure on, these fast measurement inter-frequency carrier(s) may probably be a limited set of the normal inter-frequency carrier list. This may also facilitate the measurement being performed in a shorter amount of time.

A new criterion or criteria, such as the measurement reporting criteria, may be included based on the knowledge of the network, e.g., the network node 111, which may be similar to the gNB1 in the example above, about the surrounding cells. This criterion or criteria may be used by the wireless device 130 to determine if the measurement may need to be reported to the gNB or not. The criteria may be similar to the normal mobility, e.g., handover, events but with different parameters, e.g., report the measurement if the RSRP is 6 dB worse than the gNB RSRP instead of normal 3 dB. The criteria may also be that period measurement reports may need to be performed by the wireless device 130 after each layer 3 filter period.

In this way, following the parameters or variables comprised in the Msg 4, the time it may take for the wireless device 130 to find a potential new second link 142, that is, a secondary Node (SN) with an adequate level of accuracy may be much faster, and the wireless device 130 may therefore be able to set up an MC/DC connection before the data transmission may have ended.

Measurement performance may be understood to refer to any criteria or metric which may characterize the performance of the measurement performed. One or more measurement performance criteria related to the performed measurement may have to be met. Examples of measurement performance criteria may be measurement time, number of cells to be measured with the measurement time, measurement reporting delay, measurement accuracy, measurement accuracy with respect to a reference value, e.g., ideal measurement result, etc. Examples of measurement time may be measurement period, cell identification period, evaluation period, etc.

In some embodiments, the trigger in the Msg 4 may be the measurement period. In some embodiments, the measurement period may be a layer 3 (L3) filter length. Since the measurement may be very time critical, it may be necessary to have a short layer 3 filtering.

In other embodiments, the trigger in the Msg 4 may be the bandwidth to perform the fast measurement on.

In yet other embodiments, the trigger in the Msg 4 may be the measurement reporting criteria, that is, the new measurement reporting criteria. The criteria may be understood herein as comprising one or more criteria.

The receiving in this Action 310 may be performed over the first link 141, which may be, e.g., a radio link.

Action 320

The wireless device 130, in this Action 320, performs the fast measurement on one or more carriers that the wireless device 130 receives. As stated earlier, the fast measurement is performed within at least one of: i) less than 200 milliseconds in an intra-frequency carrier, and ii) less than 480 milliseconds in an inter-frequency carrier.

The one or more carriers may be received, for example, from the second network node 112.

To perform better accuracy for the fast measurement, the wireless device 130 may measure over a wider bandwidth than default for each fast inter-frequency carrier that may be indicated by the network.

In some embodiments, the fast measurement may be performed directly during the transition to the CONNECTED state.

The fast measurement in this Action 320 may be performed over the second link 142, which may be, e.g., a radio link.

Action 330

The method 300 further comprises to send a measurement report to the network node 111 which sent the Msg 4 to the wireless device 130. Therefore in this Action 330, the wireless device 130 sends a measurement report, based on the fast measurement performed in Action 320, to the network node 111.

For example, if the wireless device 130 finds any cells that match the evaluation criteria, as e.g., comprised in the Msg 4, it may send the measurement report.

The sending in this Action 330 may be performed over the first link 141, which may be, e.g., a radio link.

Embodiments of a method 400 performed by the network node 111, will now be described with reference to the flowchart depicted in FIG. 4. The method may be understood to be for requesting measurements for fast setup.

The method comprises the following actions. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

The detailed description of some of the following corresponds to the same references provided above, in relation to the actions described for the wireless device 130, and will thus not be repeated here to simplify the description. For example, the Msg 4 may be a contention resolution.

Action 410

The network node 111, in this Action 410, transmits during the RACH procedure, the Msg 4 to the wireless device 130. The Msg 4 comprises the trigger for performing the fast measurement. The fast measurement is to be performed within at least one of: i) less than 200 milliseconds in an intra-frequency carrier, and ii) less than 480 milliseconds in an inter-frequency carrier.

In this manner, during the RACH procedure, the network, via the network node 111, may send an indication to do the fast measurement, e.g., short L3 filtering, on neighboring cells, such as the second cell 122. As stated earlier, the Msg 4 may comprise at least one of: i) the frequency to perform the fast measurement on, ii) the information relating to which carriers to perform the fast measurement on, iii) which inter-frequency carrier or inter-frequency carriers to perform the fast measurement on, iv) the measurement period to perform the fast measurement, v) the bandwidth to perform the fast measurement on, and vi) the measurement reporting criteria on surrounding cells.

In some embodiments, the measurement period may be the layer 3 (L3) filter length. Since the measurement may be very time critical, it may be necessary to have a short layer 3 filtering. In some embodiments, the trigger in the Msg 4 may be the measurement period.

In other embodiments, the trigger in the Msg 4 may be the bandwidth to perform the fast measurement on.

In yet other embodiments, the trigger in the Msg 4 may be the measurement reporting criteria, that is, the new measurement reporting criteria.

In some examples, the network node 111, may send the indication to do the fast measurement, e.g., short L3 filtering, on the neighboring cells using the Msg4 content resolution message, which may be including the frequency to do the fast measurement on, e.g. frequency f2 and f3, the L3 filter length, that is, the measurement period, the bandwidth to perform fast measure on, and the new measurement reporting criteria.

The transmitting in this Action 410 may be performed over the first link 141.

Action 420

In this Action 420, the network node 111 receives the measurement report, based on the fast measurement, from wireless device 130.

As explained earlier, the fast measurement may have been performed directly during the transition to the CONNECTED state. The receiving in this Action 420 may be performed over the first link 141.

Figure 5:
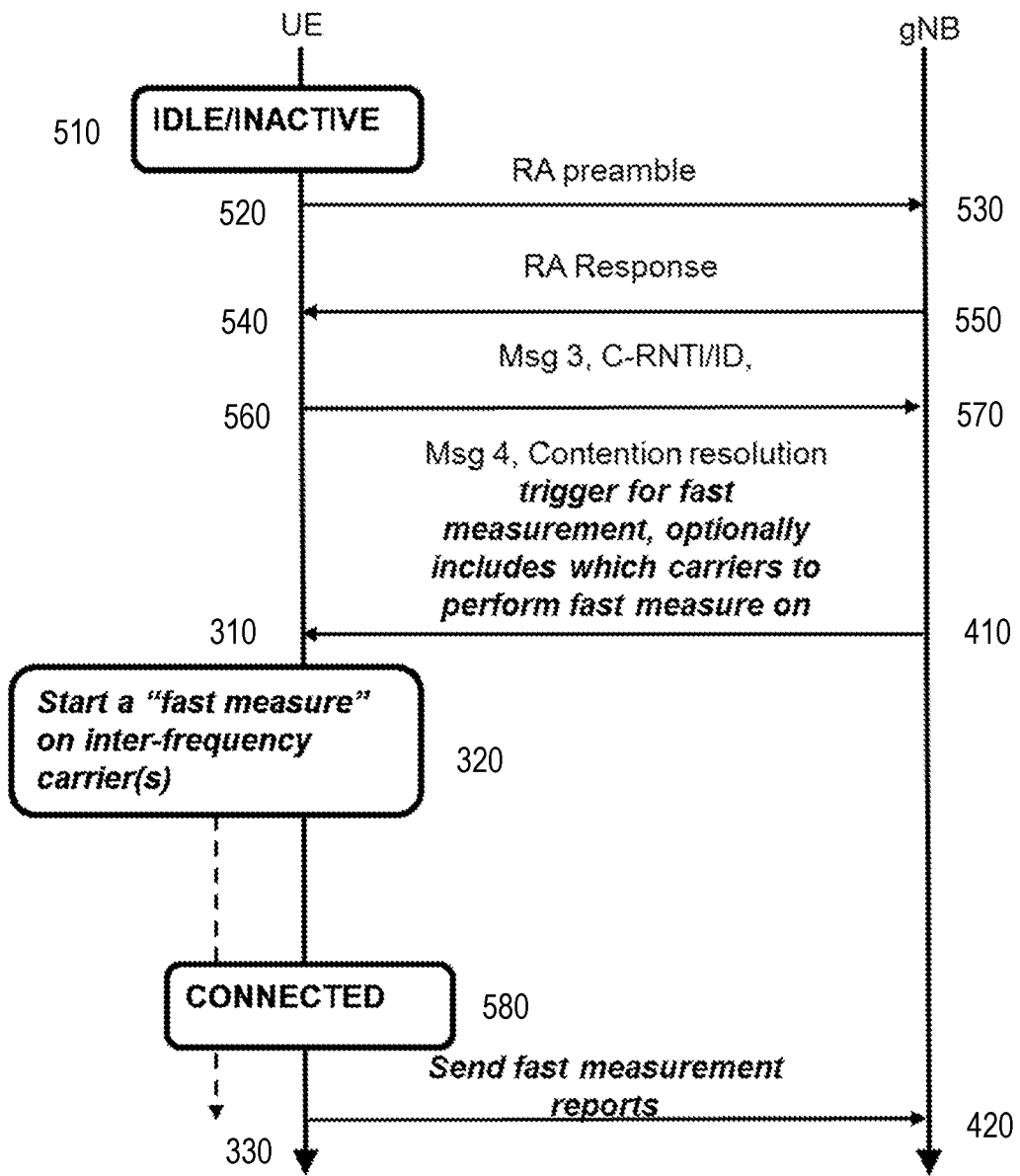
FIG. 5 is a signalling diagram between a wireless device and a network node executing method actions, according to embodiments herein.

FIG. 5 is a schematic representation of a non-limiting example of the methods that may be performed by each of the wireless device 130, which is a UE in this particular example, and the network node 111, which is a gNB in this particular example. At 510, the wireless device 130 is the idle or inactive state. When the wireless device 130 has packets of data to send, it sends a Random Access (RA) preamble to the network node 111, which the network node 111 receives at 530. At 550, the network node 111 sends an RA response to the wireless device 130, which receives it at 540. At 560, the wireless device 130 sends a Message 3 (Msg3) to the network node 111. The Msg3 comprises in this particular example a Cell Radio Network Temporary Identifier (C-RNTI) or another Identifier (ID). The network node 111 receives the Msg3 at 570, and according to Action 410 it transmits the Msg 4 comprising the trigger for performing the fast measurement to the wireless device 130. The wireless device 130 receives the Msg4 according to Action 310. As described earlier, the fast measurement may be performed directly during the transition to the CONNECTED state. According to Action 320, the wireless device 130 performs the fast measurement on the one or more carriers it receives. At 580, the wireless device 130 is in the CONNECTED mode. Subsequently, as described in Action 330, the wireless device 130 sends the fast measurement report to the network node 111, which is received by the network node 111 according to Action 420.

Embodiments herein have several advantages. One possible advantage is a better utilisation of the possible MC/DC/CA options the wireless device 130 may have, and thus a higher user throughput. This is because, according to methods herein, the wireless device 130 is enabled to measure on other carriers before it has sent the data it may have to transmit, and may detect the other carriers available to it by MC, DC or CA in time to use them for transmitting the data. Another possible advantage of embodiments herein is a better load balancing between macro cells using low frequency, and small cells using high frequency. This is because, by being enabled to detect the other carriers available to it by MC, DC or CA in time to use them for transmitting the data, it may better distribute the load between the low frequency cell and other smaller cells, using high frequency. Yet another advantage of embodiments herein is that by the wireless device 130 receiving the trigger for performing the fast measurement in the Msg 4, when the wireless device 130 may have already been identified by the network node 111, the network node 111 may be able to address the wireless device 130 and know the capability or capabilities of the of the wireless device 130, such as which frequency bands the wireless device 130 may support, which CC combination it may support, whether it has been in DC or not, etc. Additionally, the Msg 4 may provide additional benefits, such as having higher priority, and being more robust, e.g., it may be re-transmitted. The Msg 4 has higher probability to be received by the wireless device 130 than an earlier message such as the Msg 2. This is beneficial as, without a high probability of being received, the procedure may fail and the wireless device 130 may not be able to transmit any data, or may need to redo the whole RACH attempt. Furthermore, by the time the wireless device 130 receives the Msg 4, the network node 111 may have a better knowledge of a radio link condition of the wireless device 130, in comparison with an earlier message, such as the Msg 2.

Embodiments herein also relate to a wireless device operable in a radio communication network 100 for performing measurements for fast setup. The wireless device has the same technical features, objects and advantages as the method performed by the wireless device 130 described above. The wireless device will therefore be described only in brief in order to avoid unnecessary repetition. The wireless device will be described with reference to FIGS. 6 and 7.

Figure 6:
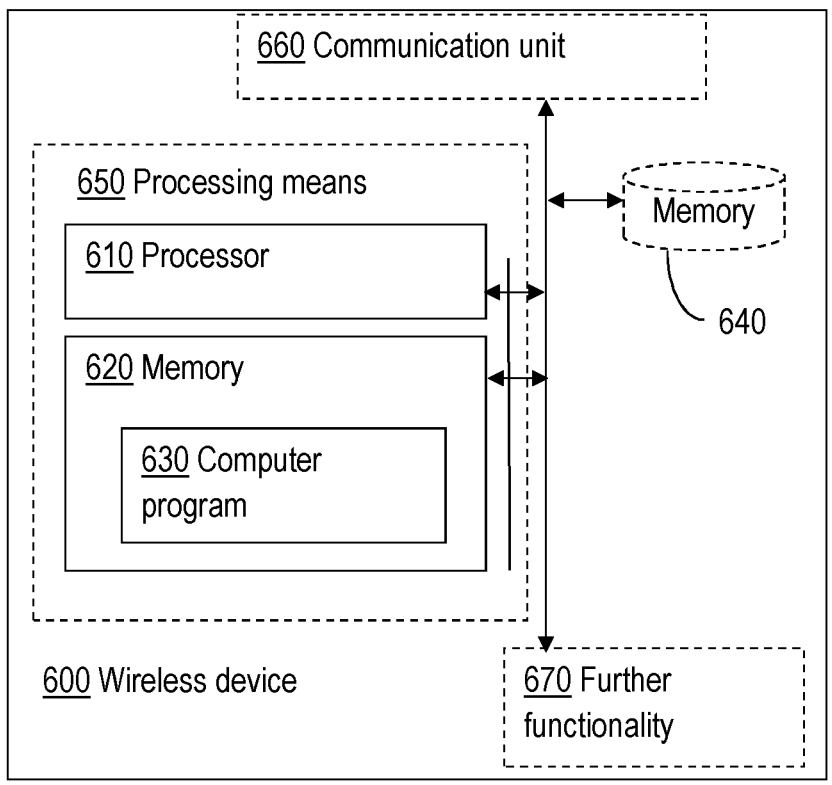
FIG. 6 is a block diagram of a wireless device for performing measurements for fast setup, according to an exemplifying embodiment.
Figure 7:
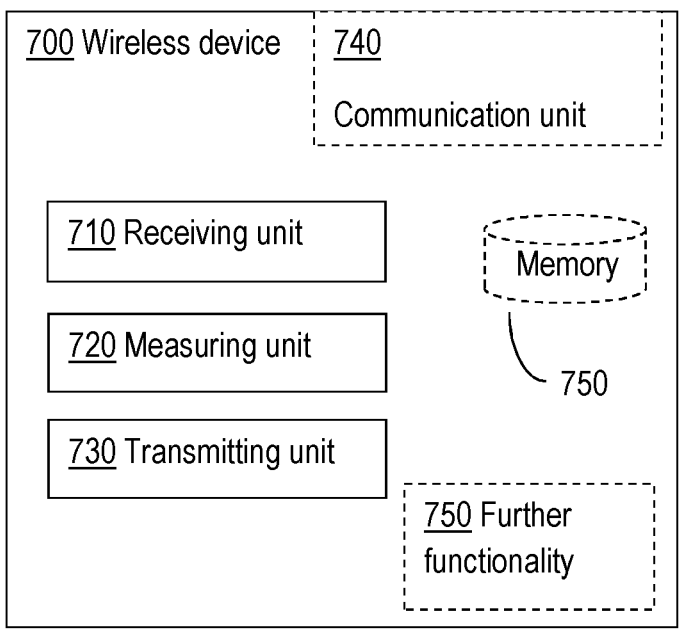
FIG. 7 is a block diagram of a wireless device for performing measurements for fast setup, according to another exemplifying embodiment.

FIGS. 6 and 7 illustrate the wireless device 600, 700, configured to perform the measurements for fast setup. The wireless device 600, 700 is further configured to receive, from the network node, during the RACH procedure, the Msg 4. The Msg 4 is configured to comprise the trigger for performing the fast measurement. The wireless device 600, 700 is further configured to perform the fast measurement on the one or more carriers that the wireless device 600, 700 is configured to receive. The fast measurement is configured to be performed within at least one of: i) less than 200 milliseconds in an intra-frequency carrier, and ii) less than 480 milliseconds in an inter-frequency carrier. The wireless device 600, 700 is further configured to send a measurement report, based on the fast measurement, to the network node.

In some particular examples, FIGS. 6 and 7 illustrate the wireless device 600, 700 being configured for: a) receiving, during the RACH procedure, the "message 4" (Msg 4) being a contention resolution, the Msg 4 comprising the trigger for performing the fast measurement; b) for performing a fast measurement on one or more carrier(s) that the wireless device 600, 700 may receive; and c) for sending a measurement report to the network node which sent the Msg 4 to the wireless device 600, 700.

In some embodiments, the Msg 4 may be configured to comprise at least one of: i) the frequency to perform the fast measurement on, ii) the information relating to which carriers to perform the fast measurement on, iii) which inter-frequency carrier or inter-frequency carriers to perform the fast measurement on, iv) the measurement period to perform the fast measurement, v) the bandwidth to perform the fast measurement on, and vi) the measurement reporting criteria on the surrounding cells.

In some embodiments, the measurement period may be the L3 filter length.

In some embodiments, the trigger in the Msg 4 may be the measurement period.

In some embodiments, the trigger in the Msg 4 may be the bandwidth to perform the fast measurement on.

In some embodiments, the trigger in the Msg 4 may be the measurement reporting criteria.

The fast measurement may be configured to be performed directly during the transition to the CONNECTED state.

The wireless device 600, 700 may be realised or implemented in different ways. A first exemplifying implementation or realisation is illustrated in FIG. 6.

FIG. 6 illustrates the wireless device 600 comprising a processor 610 and memory 620, the memory comprising instructions, e.g. by means of a computer program 630, which when executed by the processor 610 causes the wireless device 600 to be operable to receive, from the network node, e.g. the network node 111, during the RACH procedure, the Msg 4. The Msg 4 is configured to comprise the trigger for performing the fast measurement. The computer program 630, when executed by the processor 610 also causes the wireless device 600 to be operable to perform the fast measurement on the one or more carriers that the wireless device 600 is configured to receive. The fast measurement is configured to be performed within at least one of: i) less than 200 milliseconds in an intra-frequency carrier, and ii) less than 480 milliseconds in an inter-frequency carrier. The computer program 630, when executed by the processor 610 further causes the wireless device 600 to be operable to send the measurement report, based on the fast measurement, to the network node.

In particular examples, FIG. 6 illustrates the wireless device 600 comprising a processor 610 and memory 620, the memory comprising instructions, e.g. by means of a computer program 630, which when executed by the processor 610 causes the wireless device 600 to be operable to receive, during the RACH procedure, the "message 4" (Msg 4) being the contention resolution, the Msg 4 comprising the trigger for performing the fast measurement, to perform the fast measurement the on one or more carrier(s) that the wireless device 600 may receive; and to send a measurement report to the network node which sent the Msg 4 to the wireless device 600.

FIG. 6 also illustrates the wireless device 600 comprising a memory 640. It shall be pointed out that FIG. 6 is merely an exemplifying illustration and memory 640 may be optional, be a part of the memory 620 or be a further memory of the wireless device 600. The memory 640 may for example comprise information relating to the wireless device 600, to statistics of operation of the wireless device 600, just to give a couple of illustrating examples. FIG. 6 further illustrates the wireless device 600 comprising processing means 650, which comprises the memory 620 and the processor 610. Still further, FIG. 6 illustrates the wireless device 600 comprising a communication unit 660. The communication unit 660 may comprise an interface through which the wireless device 600 may communicate with other nodes or entities of the radio communication network 100 as well as other communication units. FIG. 6 also illustrates the wireless device 600 comprising further functionality 670. The further functionality 670 may comprise hardware or software that may be necessary for the wireless device 600 to perform different tasks that are not disclosed herein.

An alternative exemplifying implementation of the wireless device 600, 700 is illustrated in FIG. 7. FIG. 7 illustrates the wireless device 700 comprising a receiving unit 710 for receiving, from the network node, during the RACH procedure, the Msg 4. The Msg 4 is configured to comprise the trigger for performing a fast measurement. The wireless device 700 further comprises a measuring unit 720 for performing the fast measurement on the one or more carriers that the wireless device 700 is configured to receive. The fast measurement is configured to be performed within at least one of: i) less than 200 milliseconds in an intra-frequency carrier, and ii) less than 480 milliseconds in an inter-frequency carrier. The wireless device 700 further comprises a transmitting unit 705 for sending a measurement report, based on the fast measurement, to the network node.

In some particular examples, FIG. 7 illustrates the wireless device 700 comprising a) a receiving unit 710 for receiving, during a RACH procedure, the "message 4" (Msg 4) being a contention resolution, the Msg 4 comprising the trigger for performing the fast measurement; b) a measuring unit 720 for performing the fast measurement on the one or more carrier(s) that the wireless device 700 may receive; and c) a transmitting unit 730 for sending the measurement report to the network node which sent the Msg 4 to the wireless device.

In FIG. 7, the wireless device 700 is also illustrated comprising a communication unit 740. Through this unit, the wireless device 700 may be adapted to communicate with other nodes and/or entities in the radio communication network 100. The wireless device 700 is further illustrated comprising a memory 750 for storing data. Further, the wireless device 700 may comprise a control or processing unit, not shown, which in turn may be connected to the different units 710-730. FIG. 7 also illustrates the wireless device 700 comprising further functionality 750. The further functionality 750 may comprise hardware or software that may be necessary for the wireless device 700 to perform different tasks that are not disclosed herein. It may be pointed out that this is merely an illustrative example, and the wireless device 700 may comprise more, less or other units or modules which execute the functions of the wireless device 700 in the same manner as the units illustrated in FIG. 7.

It should be noted that FIG. 7 merely illustrates various functional units in the wireless device 700 in a logical sense. The functions in practice may be implemented using any suitable software and hardware means/circuits etc. Thus, the embodiments are generally not limited to the shown structures of the wireless device 700 and the functional units. Hence, the previously described exemplary embodiments may be realised in many ways. For example, one embodiment may include a computer-readable medium having instructions stored thereon that are executable by the control or processing unit for executing the method actions or steps in the wireless device 700. The instructions executable by the computing system and stored on the computer-readable medium may perform the method actions or steps of the wireless device 700 as set forth in the embodiments and examples described herein.

The wireless device 600, 700 has the same possible advantages as the method performed by the wireless device 130. One possible advantage is better utilisation of the possible MC/DC/CA options and thus to obtain higher user throughput. Another possible advantage is to achieve better load balancing between macro cells using low frequency and small cells using high frequency.

Embodiments herein also relate to a network node operable in a radio communication network 100 for requesting measurements for fast setup. The network node has the same technical features, objects and advantages as the method performed by the network node 111 described above. The network node will therefore be described only in brief in order to avoid unnecessary repetition. The network node will be described with reference to FIGS. 8 and 9.

Figure 8:
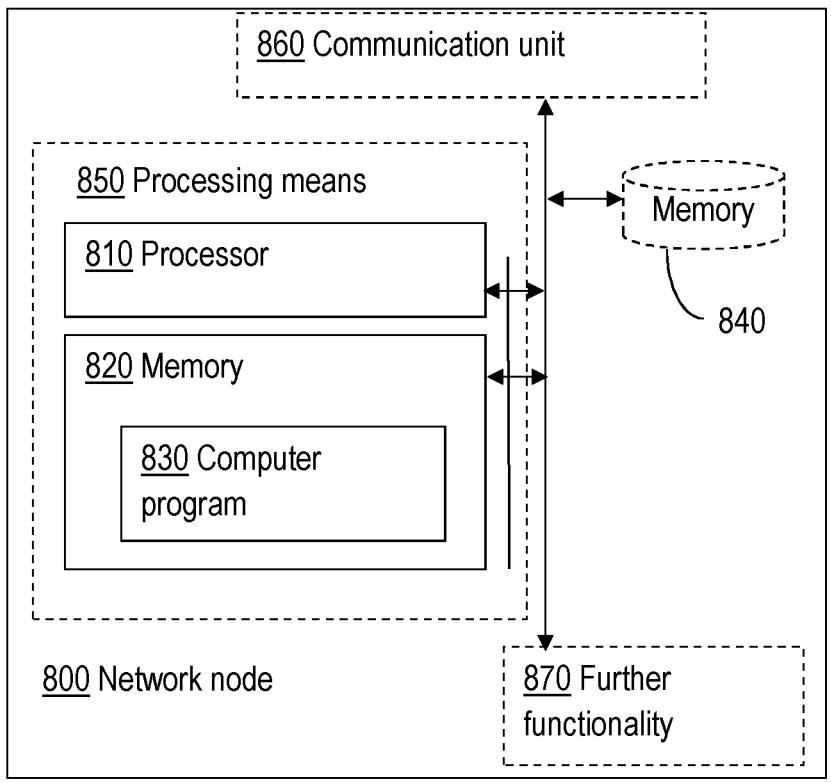
FIG. 8 is a block diagram of a network node for requesting measurements for fast setup, according to an exemplifying embodiment.
Figure 9:
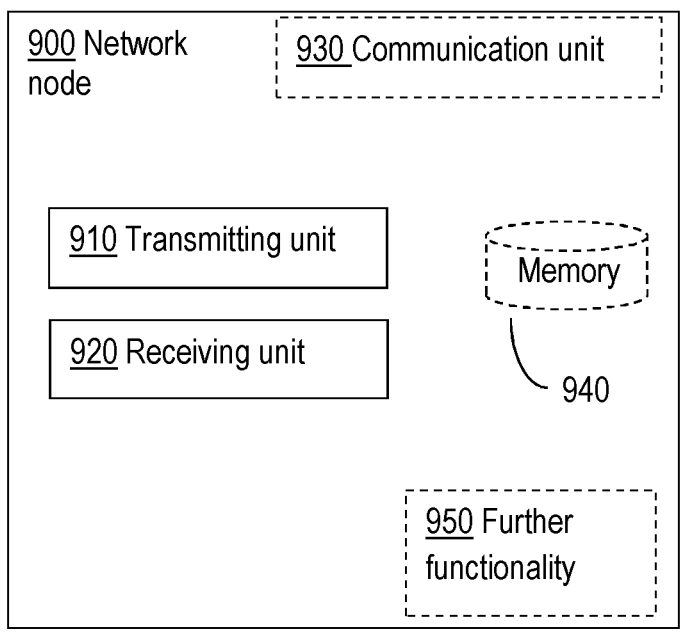
FIG. 9 is a block diagram of a network node for requesting measurements for fast setup, according to another exemplifying embodiment.

FIGS. 8 and 9 illustrate the network node 800, 900, configured to request the measurements for fast setup. The network node 800, 900 is further configured to transmit, during the RACH procedure, the Msg 4 to the wireless device 600, 700. The Msg 4 is configured to comprise the trigger for performing the fast measurement. The fast measurement is configured to be performed within at least one of: i) less than 200 milliseconds in an intra-frequency carrier, and ii) less than 480 milliseconds in an inter-frequency carrier. The network node 800, 900 is further configured to receive the measurement report, based on the fast measurement, from wireless device 600, 700.

In particular examples, FIGS. 8 and 9 illustrate the network node 800, 900 being configured a) for transmitting, during a RACH procedure, the "message 4" (Msg 4) being a contention resolution to the wireless device 600, 700, the Msg 4 comprising the trigger for performing a fast measurement; and b) for receiving the measurement report from the wireless device 600, 700.

In some embodiments, the Msg 4 is configured to comprise at least one of: i) the frequency to perform the fast measurement on, ii) the information relating to which carriers to perform the fast measurement on, iii) which inter-frequency carrier or inter-frequency carriers to perform the fast measurement on, iv) the measurement period to perform the fast measurement, v) the bandwidth to perform the fast measurement on, and vi) the measurement reporting criteria on the surrounding cells.

In some embodiments, the measurement period may be the L3 filter length.

In some embodiments, the trigger in the Msg 4 may be the measurement period.

In some embodiments, the trigger in the Msg 4 may be the bandwidth to perform the fast measurement on.

In some embodiments, the trigger in the Msg 4 may be the measurement reporting criteria.

The fast measurement may be configured to be performed directly during the transition to the CONNECTED state.

The network node 800, 900 may be realised or implemented in different ways. A first exemplifying implementation or realisation is illustrated in FIG. 8. FIG. 8 illustrates the network node 800 comprising a processor 810 and memory 820, the memory comprising instructions, e.g., by means of a computer program 830, which when executed by the processor 810 causes the network node 800 to transmit, during the RACH procedure, the Msg 4 to the wireless device 600, 700. The Msg 4 is configured to comprise the trigger for performing the fast measurement. The fast measurement is configured to be performed within at least one of: i) less than 200 milliseconds in an intra-frequency carrier, and ii) less than 480 milliseconds in an inter-frequency carrier. The computer program 830, when executed by the processor 810 further causes the network node 800 to receive the measurement report, based on the fast measurement, from wireless device 600, 700.

In particular examples, the computer program 830, when executed by the processor 810 may cause the network node 800 a) to transmit, during the RACH procedure, the "message 4" (Msg 4) being a contention resolution to the wireless device 600, 700, the Msg 4 comprising a trigger for performing the fast measurement; and b) to receive the measurement report from the wireless device 600, 700.

FIG. 8 also illustrates the network node 800 comprising a memory 840. It may be pointed out that FIG. 8 is merely an exemplifying illustration and memory 840 may be optional, be a part of the memory 820 or be a further memory of the network node 800. The memory may for example comprise information relating to the network node 800, to statistics of operation of the network node 800, just to give a couple of illustrating examples. FIG. 8 further illustrates the network node 800 comprising processing means 850, which comprises the memory 820 and the processor 810. Still further, FIG. 8 illustrates the network node 800 comprising a communication unit 860. The communication unit 860 may comprise an interface through which the network node 800 may communicate with other nodes or entities of the radio communication network 100 as well as other communication units. FIG. 8 also illustrates the network node 800 comprising further functionality 870. The further functionality 870 may comprise hardware or software necessary for the network node 800 to perform different tasks that are not disclosed herein.

An alternative exemplifying implementation of the network node 800, 900 is illustrated in FIG. 9. FIG. 9 illustrates the network node 900 comprising a transmitting unit 910 for transmitting, during the RACH procedure, the Msg 4 to the wireless device 600, 700. The Msg 4 is configured to comprise the trigger for performing the fast measurement. The fast measurement is configured to be performed within at least one of: i) less than 200 milliseconds in an intra-frequency carrier, and ii) less than 480 milliseconds in an inter-frequency carrier. The network node 900 further comprises a receiving unit 920 for receiving the measurement report, based on the fast measurement, from wireless device 600, 700.

In some particular examples, FIG. 9 illustrates the network node 900 comprising a) a transmitting unit 910 for transmitting, during the RACH procedure, the "message 4" (Msg 4) being a contention resolution to the wireless device 600, 700, the Msg 4 comprising the trigger for performing the fast measurement; and b) a receiving unit 920 for receiving the measurement report from the wireless device 600, 700.

In FIG. 9, the network node 900 is also illustrated comprising a communication unit 930. Through this unit, the network node 900 may be adapted to communicate with other nodes and/or entities in the radio communication network 100. The network node 900 is further illustrated comprising a memory 940 for storing data. Further, the network node 900 may comprise a control or processing unit, not shown, which in turn is connected to the different units 910-920. FIG. 9 also illustrates the network node 900 comprising further functionality 950. The further functionality 950 may comprise hardware or software necessary for the network node 900 to perform different tasks that are not disclosed herein. It may be pointed out that this is merely an illustrative example and the network node 900 may comprise more, less or other units or modules which execute the functions of the network node 900 in the same manner as the units illustrated in FIG. 9.

It should be noted that FIG. 9 merely illustrates various functional units in the network node 900 in a logical sense. The functions in practice may be implemented using any suitable software and hardware means/circuits etc. Thus, the embodiments are generally not limited to the shown structures of the network node 900 and the functional units. Hence, the previously described exemplary embodiments may be realised in many ways. For example, one embodiment may include a computer-readable medium having instructions stored thereon that are executable by the control or processing unit for executing the method actions or steps in the network node 900. The instructions executable by the computing system and stored on the computer-readable medium may perform the method actions or steps of the network node 900 as set forth in the embodiments and examples described herein.

The network node 800, 900 has the same possible advantages as the method performed by the network node 111. One possible advantage is the better utilisation of the possible MC/DC/CA options and thus to obtain higher user throughput. Another possible advantage is to achieve better load balancing between macro using low frequency, and small cells using high frequency.

Figure 10:
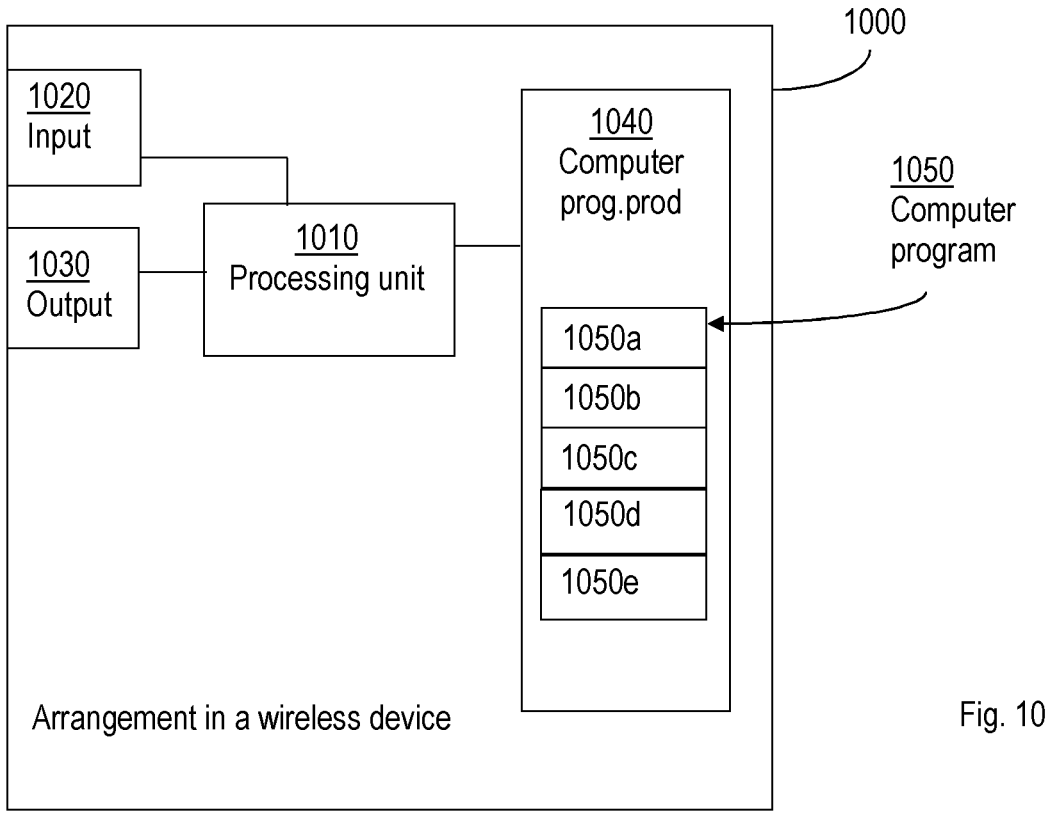
FIG. 10 is a block diagram of an arrangement in a wireless device for performing measurements for fast setup, according to an exemplifying embodiment.

FIG. 10 schematically shows an embodiment of an arrangement 1000 in the wireless device 700. Comprised in the arrangement 1000 in a wireless device 700 are here a processing unit 1010, e.g. with a Digital Signal Processor, DSP. The processing unit 1010 may be a single unit or a plurality of units to perform different actions of procedures described herein. The arrangement 1000 in a wireless device 700 may also comprise an input unit 1020 for receiving signals from other entities, and an output unit 1030 for providing signal(s) to other entities. The input unit 1020 and the output unit 1030 may be arranged as an integrated entity or as illustrated in the example of FIG. 7, as one or more interfaces, also referred to herein as communication units 740.

Furthermore, the arrangement 1000 in a wireless device 700 may comprise at least one computer program product 1040 in the form of a non-volatile memory, e.g. an Electrically Erasable Programmable Read-Only Memory, EEPROM, a flash memory and a hard drive. The computer program product 1040 may comprise a computer program 1050, which may comprise code means, which when executed in the processing unit 1010 in the arrangement 1000 in a wireless device 700 may cause the wireless device 700 to perform the actions e.g., of the procedure described earlier in conjunction with FIG. 3.

The computer program 1050 may be configured as a computer program code structured in computer program modules 1050a-1050e. Hence, in an exemplifying embodiment, the code means in the computer program of the arrangement 1000 in a wireless device 700 may comprise a receiving unit, or module, for receiving, from the network node, during the RACH procedure, the Msg 4. The Msg 4 is configured to comprise the trigger for performing the fast measurement. The code means in the computer program of the arrangement 1000 in a wireless device 700 comprises a measuring unit, or module, for performing the fast measurement on the one or more carriers that the wireless device 700 is configured to receive. The fast measurement is configured to be performed within at least one of: i) less than 200 milliseconds in an intra-frequency carrier, and ii) less than 480 milliseconds in an inter-frequency carrier. The code means in the computer program of the arrangement 1000 in a wireless device 700 comprises a transmitting unit, or module, for sending the measurement report, based on the fast measurement, to the network node.

In a particular exemplifying embodiment, the code means in the computer program 1050 of the arrangement 1000 in the wireless device 700 may comprise a) a receiving unit, or module, for receiving, during a RACH procedure, the "message 4" (Msg 4) being a contention resolution, the Msg 4 comprising the trigger for performing the fast measurement; b) a measuring unit, or module for performing the fast measurement on the one or more carrier(s) that the wireless device 700 may receive; and c) a transmitting unit, or module, for sending the measurement report to the network node which sent the Msg 4 to the wireless device 700.

Figure 3:
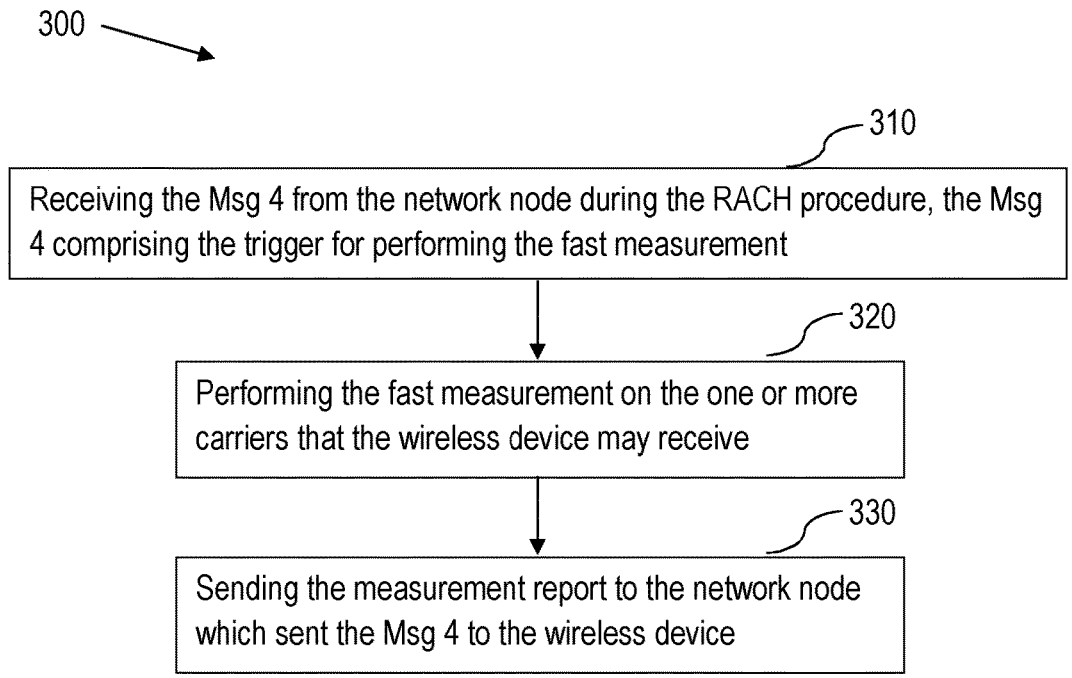
FIG. 3 is a flowchart of a method performed by a wireless device for performing measurements for fast setup, according to an exemplifying embodiment.

The computer program modules may essentially perform the actions of the flow illustrated in FIG. 3, to emulate the wireless device 700. In other words, when the different computer program modules may be executed in the processing unit 1010, they may correspond to the units 710-730 of FIG. 7.

Figure 11:
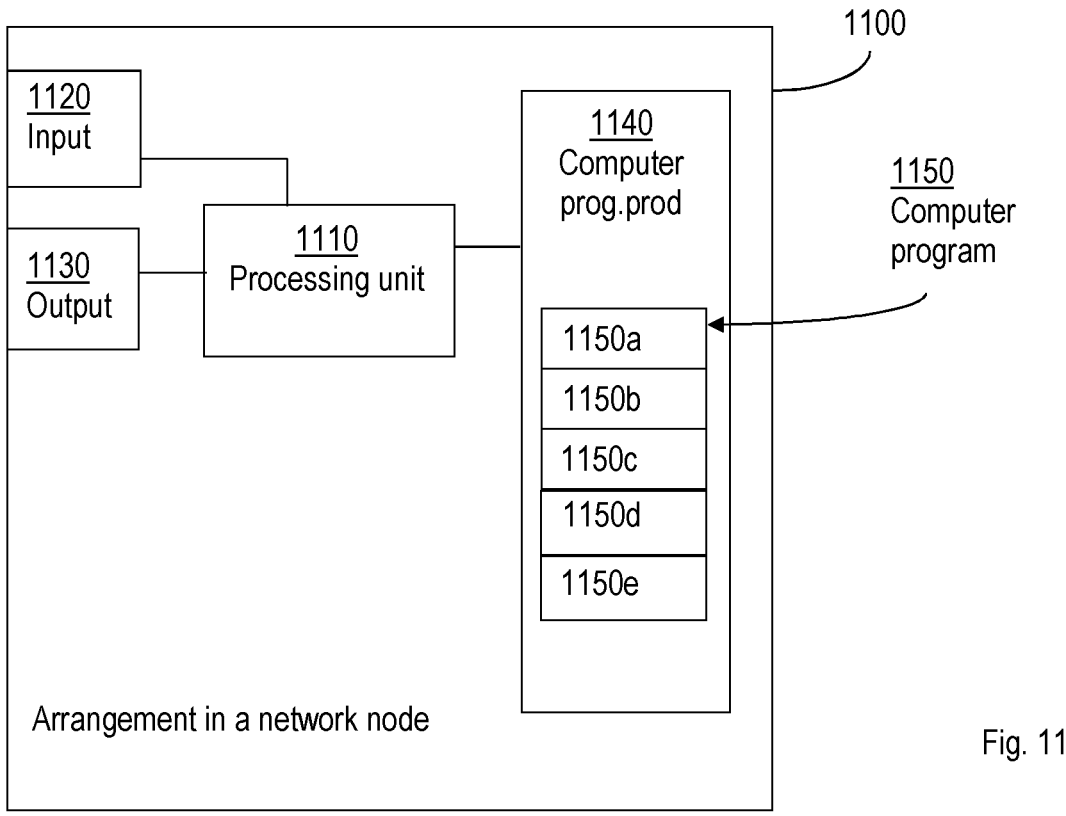
FIG. 11 is a block diagram of an arrangement in a network node for requesting measurements for fast setup, according to an exemplifying embodiment.

FIG. 11 schematically shows an embodiment of an arrangement 1100 in a network node 900. Comprised in the arrangement 1100 in a network node 900 are in this example a processing unit 1110, e.g. with a Digital Signal Processor, DSP. The processing unit 1110 may be a single unit or a plurality of units to perform different actions of procedures described herein. The arrangement 1100 in a network node 900 may also comprise an input unit 1120 for receiving signals from other entities, and an output unit 1130 for providing signal(s) to other entities. The input unit 1120 and the output unit 1130 may be arranged as an integrated entity or as illustrated in the example of FIG. 9, as one or more interfaces, which may also be referred to herein as communication units 860.

Furthermore, the arrangement 1100 in a network node 900 comprises at least one computer program product 1140 in the form of a non-volatile memory, e.g. an Electrically Erasable Programmable Read-Only Memory, EEPROM, a flash memory and a hard drive. The computer program product 1140 may comprise a computer program 1150, which may comprises code means, which when executed in the processing unit 1110 in the arrangement 1100 in a network node 900 may cause the network node 900 to perform the actions e.g. of the procedure described earlier in conjunction with FIG. 4.

The computer program 1150 may be configured as a computer program code structured in computer program modules 1150a-1150e. Hence, in an exemplifying embodiment, the code means in the computer program of the arrangement 1100 in a network node 900 may comprise a transmitting unit, or module, for transmitting, during the RACH procedure, the Msg 4 to the wireless device 600, 700. The Msg 4 is configured to comprise the trigger for performing the fast measurement. The fast measurement is configured to be performed within at least one of: i) less than 200 milliseconds in an intra-frequency carrier, and ii) less than 480 milliseconds in an inter-frequency carrier. The network node 900 may further comprise a receiving unit, or module for receiving the measurement report, based on the fast measurement, from wireless device 600, 700.

In some particular examples, the code means in the computer program of the arrangement 1100 in a network node 900 may comprise a) a transmitting unit, or module, for transmitting, during a RACH procedure, the "message 4" (Msg 4) being a contention resolution to the wireless device 600, 700, the Msg 4 comprising the trigger for performing the fast measurement; and b) a receiving unit, or module, for receiving the measurement report from the wireless device 600, 700.

Figure 4:
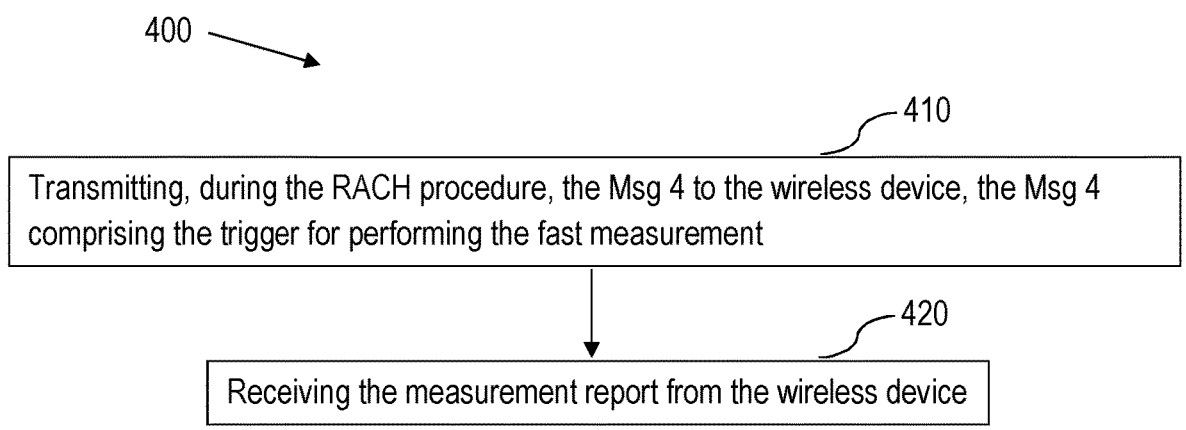
FIG. 4 is a flowchart of a method performed by a network node for requesting measurements for fast setup, according to an exemplifying embodiment.

The computer program modules may perform the actions of the flow illustrated in FIG. 4, to emulate the network node 900. In other words, when the different computer program modules are executed in the processing unit 1110, they may correspond to the units 910-920 of FIG. 9.

Although the code means in the embodiments disclosed above in conjunction with FIGS. 10 and 11, is implemented as computer program modules which when executed in the respective processing unit causes the wireless device 600, 700 and the network node 800, 900, respectively, to perform the actions described above in the conjunction with figures mentioned above, at least one of the code means may in alternative embodiments be implemented at least partly as hardware circuits.

The processor 610, 810 may be a single Central Processing Unit, CPU, but could also comprise two or more processing units. For example, the processor 610, 810 may include general purpose microprocessors; instruction set processors and/or related chips sets and/or special purpose microprocessors such as Application Specific Integrated Circuits, ASICs. The processor 610, 810 may also comprise board memory for caching purposes. The computer program 1050, 1150 may be carried by a computer program product 1040, 1140 connected to the processor 610, 810. The computer program product 1040, 1140 may comprise a computer readable medium on which the computer program 1050, 1150 is stored. For example, the computer program product 1040, 1140 may be a flash memory, a Random-Access Memory RAM, Read-Only Memory, ROM, or an EEPROM, and the computer program modules described above could in alternative embodiments be distributed on different computer program products in the form of memories within the wireless device 600, 700 and the network node 800, 900, respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended embodiments include such alternatives, modifications, permutations and equivalents as fall within the scope of the embodiments and defined by the pending embodiments.

When using the word "comprise" or "comprising" it shall be interpreted as non-limiting, i.e. meaning "consist at least of".

The term module may be understood herein as being equivalent to the term unit.

The term processor may be understood to refer to a hardware component, e.g., a processing circuit.

A brief overview of some particular examples of embodiments herein may be provided according to four aspects.

According to a first aspect, a method performed by a wireless device for performing measurements for fast setup may be provided. The method may comprise receiving, during a RACH procedure, a "message 4" (Msg 4) being a contention resolution, the Msg 4 comprising a trigger for performing a fast measurement. The method may also comprise performing a fast measurement on one or more carrier(s) that the wireless device may receive. The method may further comprise sending a measurement report to the network node which sent the Msg 4 to the wireless device.

According to a second aspect, a method performed by a network node for requesting measurements for fast setup may be provided. The method may comprise transmitting, during a RACH procedure, a "message 4" (Msg 4) being a contention resolution to the wireless device, the Msg 4 comprising a trigger for performing a fast measurement. The method may also comprise receiving a measurement report from the wireless device.

According to a third aspect, a wireless device for performing measurements for fast setup may be provided. The wireless device may be configured for receiving, during a RACH procedure, a "message 4" (Msg 4) being a contention resolution, the Msg 4 comprising a trigger for performing a fast measurement; for performing a fast measurement on one or more carrier(s) that the wireless device may receive; and for sending a measurement report to the network node which sent the Msg 4 to the wireless device.

According to a fourth aspect, a network node for requesting measurements for fast setup is provided. The network node may be configured for transmitting, during a RACH procedure, a "message 4" (Msg 4) being a contention resolution to the wireless device, the Msg 4 comprising a trigger for performing a fast measurement; and for receiving a measurement report from the wireless device.

The invention claimed is:

1. A method performed by a wireless device for performing measurements for fast setup, the method comprising:
   receiving, from a network node, during a Random Access Channel, RACH, procedure, a message 4, Msg 4, and the Msg 4 comprising a trigger for performing a fast measurement,
   performing the fast measurement on one or more carrier(s) that the wireless device receives, wherein the fast measurement is performed within at least one of:
      i. less than 200 milliseconds in an intra-frequency carrier, and
      ii. less than 480 milliseconds in an inter-frequency carrier,
   sending a measurement report, based on the fast measurement, to the network node.

2. The method according to claim 1, wherein the Msg 4 comprises at least one of:
   i. a frequency to perform the fast measurement on,
   ii. information relating to which carriers to perform the fast measurement on,
   iii. which inter-frequency carrier or inter-frequency carriers to perform the fast measurement on,
   iv. a measurement period to perform the fast measurement,
   v. a bandwidth to perform the fast measurement on, and
   vi. a measurement reporting criteria on surrounding cells.

3. The method according to claim 2, wherein the measurement period is a layer 3, L3, filter length.

4. The method according to claim 1, wherein the trigger in the Msg 4 is the measurement period, the bandwidth to perform the fast measurement on, or the measurement reporting criteria.

5. The method according to claim 1, wherein the fast measurement is performed directly during the transition to a CONNECTED state.

6. A method performed by a network node for requesting measurements for fast setup, the method comprising:
   transmitting, during a Random Access Channel, RACH, procedure, a message 4, Msg 4, to the wireless device, the Msg 4 comprising a trigger for performing a fast measurement, wherein the fast measurement is to be performed within at least one of:
   i. less than 200 milliseconds in an intra-frequency carrier, and
   ii. less than 480 milliseconds in an inter-frequency carrier, and
   receiving a measurement report, based on the fast measurement, from the wireless device.

7. The method according to claim 6, wherein the Msg 4 comprises at least one of:
   vii. a frequency to perform the fast measurement on,
   viii. information relating to which carriers to perform the fast measurement on,
   ix. which inter-frequency carrier or inter-frequency carriers to perform the fast measurement on,
   x. a measurement period to perform the fast measurement,
   xi. a bandwidth to perform the fast measurement on, and
   xii. a measurement reporting criteria on surrounding cells.

8. The method according to claim 7, wherein the measurement period is a layer 3, L3, filter length.

9. The method according to claim 6, wherein the trigger in the Msg 4 is the measurement period, the bandwidth to perform the fast measurement on, or the measurement reporting criteria.

10. The method according to claim 6, wherein the fast measurement is performed directly during the transition to a CONNECTED state.

11. A wireless device configured to perform measurements for fast setup, the wireless device being further configured to:
   receive, from a network node, during a Random Access Channel, RACH, procedure, a message 4, Msg 4, and the Msg 4 comprising a trigger for performing a fast measurement,
   perform the fast measurement on one or more carrier(s) that the wireless device is configured to receive, wherein the fast measurement is configured to be performed within at least one of:
   i. less than 200 milliseconds in an intra-frequency carrier, and
   ii. less than 480 milliseconds in an inter-frequency carrier,
   send a measurement report, based on the fast measurement, to the network node.

12. The wireless device according to claim 11, wherein the Msg 4 is configured to comprise at least one of:
   xiii. a frequency to perform the fast measurement on,
   xiv. information relating to which carriers to perform the fast measurement on,
   xv. which inter-frequency carrier or inter-frequency carriers to perform the fast measurement on,
   xvi. a measurement period to perform the fast measurement,
   xvii. a bandwidth to perform the fast measurement on, and
   xviii. a measurement reporting criteria on surrounding cells.

13. The wireless device according to claim 12, wherein the measurement period is a layer 3, L3, filter length.

14. The wireless device according to claim 11, wherein the trigger in the Msg 4 is the measurement period, the bandwidth to perform the fast measurement on, or the measurement reporting criteria.

15. The wireless device according to claim 11, wherein the fast measurement is configured to be performed directly during the transition to a CONNECTED state.

16. A network node configured to request measurements for fast setup, the network node being further configured to:
   transmit, during a Random Access Channel, RACH, procedure, a message 4, Msg 4, to the wireless device, the Msg 4 being configured to comprise a trigger for performing a fast measurement, wherein the fast measurement is configured to be performed within at least one of:
   i. less than 200 milliseconds in an intra-frequency carrier, and
   ii. less than 480 milliseconds in an inter-frequency carrier, and
   receive a measurement report, based on the fast measurement, from wireless device.

17. The network node according to claim 16, wherein the Msg 4 is configured to comprise at least one of:
   xix. a frequency to perform the fast measurement on,
   xx. information relating to which carriers to perform the fast measurement on,
   xxi. which inter-frequency carrier or inter-frequency carriers to perform the fast measurement on,
   xxii. a measurement period to perform the fast measurement,
   xxiii. a bandwidth to perform the fast measurement on, and
   xxiv. a measurement reporting criteria on surrounding cells.

18. The network node according to claim 17, wherein the measurement period is a layer 3, L3, filter length.

19. The network node according to claim 16, wherein the trigger in the Msg 4 is the measurement period, the bandwidth to perform the fast measurement on, or the measurement reporting criteria.

20. The network node according to claim 16, wherein the fast measurement is configured to be performed directly during the transition to a CONNECTED state.

* * * * *